(12) United States Patent
Ko et al.

(10) Patent No.: US 11,366,259 B2
(45) Date of Patent: Jun. 21, 2022

(54) OPTICAL FILM, OPTICAL ELEMENT, AND IMAGING DEVICE

(71) Applicant: LG CHEM, LTD., Seoul (KR)

(72) Inventors: Dong Ho Ko, Daejeon (KR); Kyung Ki Hong, Daejeon (KR); Young Min Lee, Daejeon (KR); Doo Young Huh, Daejeon (KR); So Ra Yoon, Daejeon (KR); Sun Kug Kim, Daejeon (KR); Ji Won Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 50 days.

(21) Appl. No.: 16/650,231

(22) PCT Filed: Sep. 21, 2018

(86) PCT No.: PCT/KR2018/011305
§ 371 (c)(1),
(2) Date: Mar. 24, 2020

(87) PCT Pub. No.: WO2019/066429
PCT Pub. Date: Apr. 4, 2019

(65) Prior Publication Data
US 2021/0199870 A1 Jul. 1, 2021

(30) Foreign Application Priority Data
Sep. 26, 2017 (KR) .................. 10-2017-0124103

(51) Int. Cl.
*G02B 5/30* (2006.01)
*G02B 5/22* (2006.01)
(Continued)

(52) U.S. Cl.
CPC .......... *G02B 5/3083* (2013.01); *G02B 5/223* (2013.01); *G02B 5/3016* (2013.01);
(Continued)

(58) Field of Classification Search
CPC .... G02B 5/3083; G02B 5/223; G02B 5/3016; G02B 27/0101; G02B 27/4205;
(Continued)

(56) References Cited

U.S. PATENT DOCUMENTS

2003/0025861 A1    2/2003  Vogels et al.
2005/0190327 A1*   9/2005  Lin .................. G02F 1/133634
                                                        349/119
2007/0206282 A1    9/2007  Miyatake et al.
(Continued)

FOREIGN PATENT DOCUMENTS

CN    100368833       2/2008
CN    101201494 A     6/2008
(Continued)

*Primary Examiner* — Hoan C Nguyen
(74) *Attorney, Agent, or Firm* — Dentons US LLP

(57) ABSTRACT

The present application relates to an optical film, an optical element and an imaging device. The optical film of the present application does not only exhibit broadband polarization conversion characteristics in the visible light region, but also has absorption bands in the visible light region. Such an optical film can be applied to an imaging device such as an augmented reality apparatus as an optical element such as a diffractive light guide plate laminate to suppress crosstalk.

16 Claims, 10 Drawing Sheets

(51) Int. Cl.
  *G02B 27/01* (2006.01)
  *G02B 27/42* (2006.01)
  *G02F 1/1335* (2006.01)

(52) U.S. Cl.
  CPC ..... *G02B 27/0101* (2013.01); *G02B 27/4205* (2013.01); *G02F 1/133514* (2013.01); *G02B 2027/0118* (2013.01)

(58) Field of Classification Search
  CPC ........ G02B 2027/0118; G02B 27/0081; G02B 27/0172; G02B 2027/012; G02F 1/33514; G02F 1/133514
  See application file for complete search history.

(56) References Cited

U.S. PATENT DOCUMENTS

| | | | |
|---|---|---|---|
| 2007/0264499 | A1 | 11/2007 | Choi et al. |
| 2009/0167999 | A1 | 7/2009 | Ohmori et al. |
| 2013/0044286 | A1 | 2/2013 | Yoon et al. |
| 2014/0253847 | A1 | 9/2014 | Saneto et al. |
| 2016/0363770 | A1 | 12/2016 | Kim et al. |
| 2017/0010398 | A1 | 1/2017 | Ishikawa et al. |
| 2017/0131552 | A1* | 5/2017 | Yokoyama ........... G02B 5/1866 |
| 2017/0248790 | A1* | 8/2017 | Cheng ................ G02B 27/0172 |

FOREIGN PATENT DOCUMENTS

| | | | |
|---|---|---|---|
| CN | 101512402 | A | 8/2009 |
| CN | 103477255 | A | 12/2013 |
| CN | 103823267 | A | 5/2014 |
| EP | 2733517 | A1 | 5/2014 |
| JP | 7-43634 | A | 2/1995 |
| JP | 2005-266696 | A | 9/2005 |
| JP | 2008-500596 | A | 1/2008 |
| JP | 2008-268913 | A | 11/2008 |
| JP | 2009-31474 | A | 2/2009 |
| JP | 2010-49146 | A | 3/2010 |
| JP | 2010-134349 | A | 6/2010 |
| JP | 2014-132328 | A | 7/2014 |
| JP | 2015-501955 | A | 1/2015 |
| KR | 10-20080059832 | A | 7/2008 |
| KR | 10-20090056210 | A | 6/2009 |
| KR | 10-20130016135 | A | 2/2013 |
| KR | 1020150010461 | A | 1/2015 |
| KR | 10-20160147636 | A | 12/2016 |
| KR | 10-20170058894 | A | 5/2017 |
| TW | 201339661 | | 10/2013 |
| WO | 2008032615 | A | 3/2008 |
| WO | 2016/056617 | A1 | 4/2016 |

\* cited by examiner

[Figure 1]

| 10 |
|---|
| 30 |
| 20 |

[Figure 2]

| 101 |
|---|
| 102 |
| 30 |
| 202 |
| 201 |

[Figure 3]

| 40 |
|---|
| 10 |
| 30 |
| 20 |
| 50 |

[Figure 4]
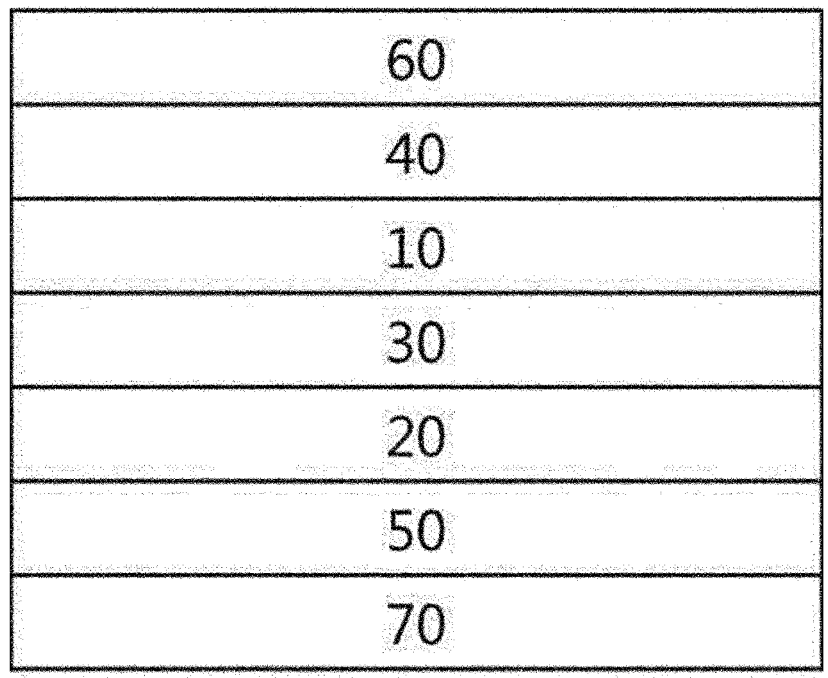

[Figure 5]
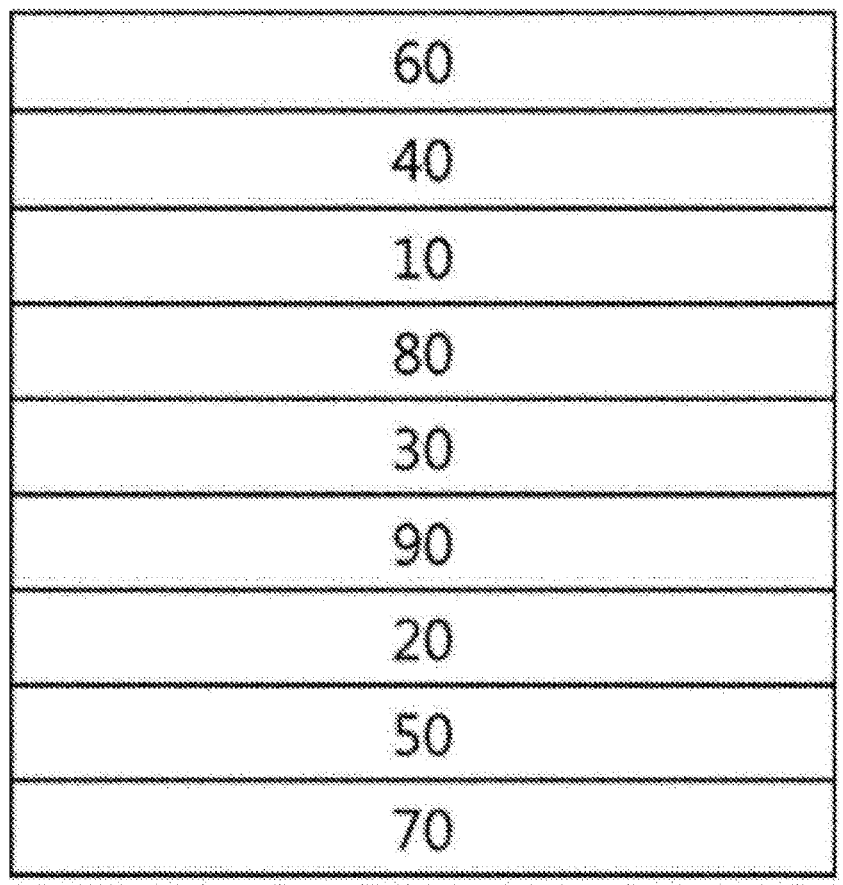

[Figure 6]

| 60 |
|---|
| 40 |
| 80 |
| 10 |
| 30 |
| 20 |
| 90 |
| 50 |
| 70 |

[Figure 7]
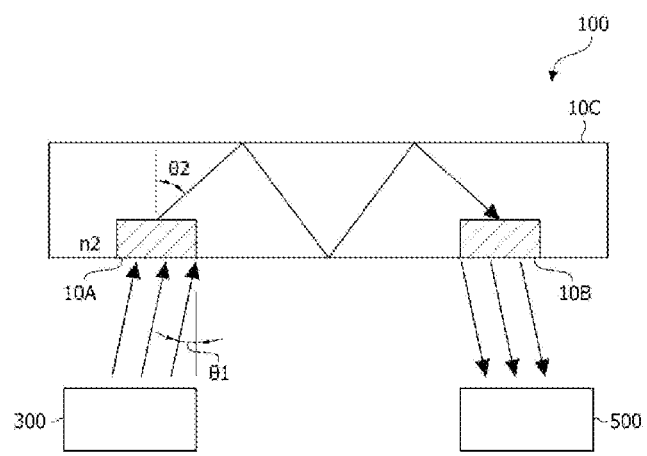
[Figure 8]
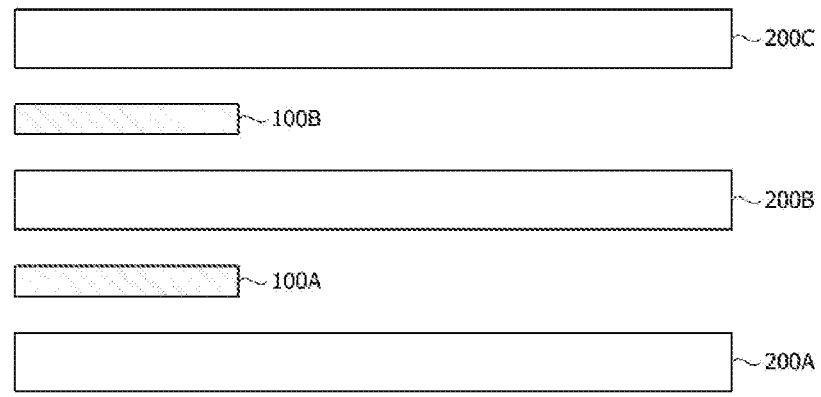

[Figure 9]
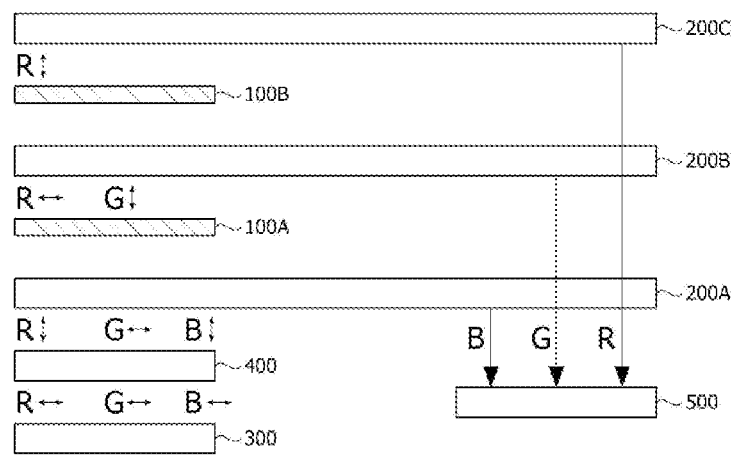

[Figure 10]
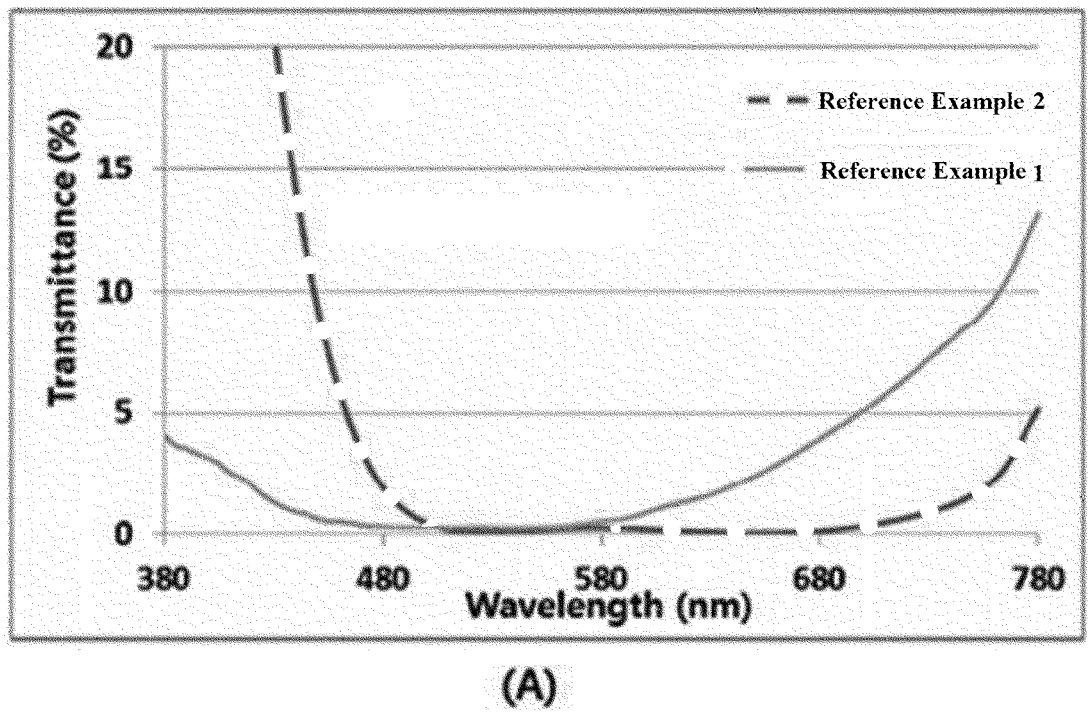
(A)
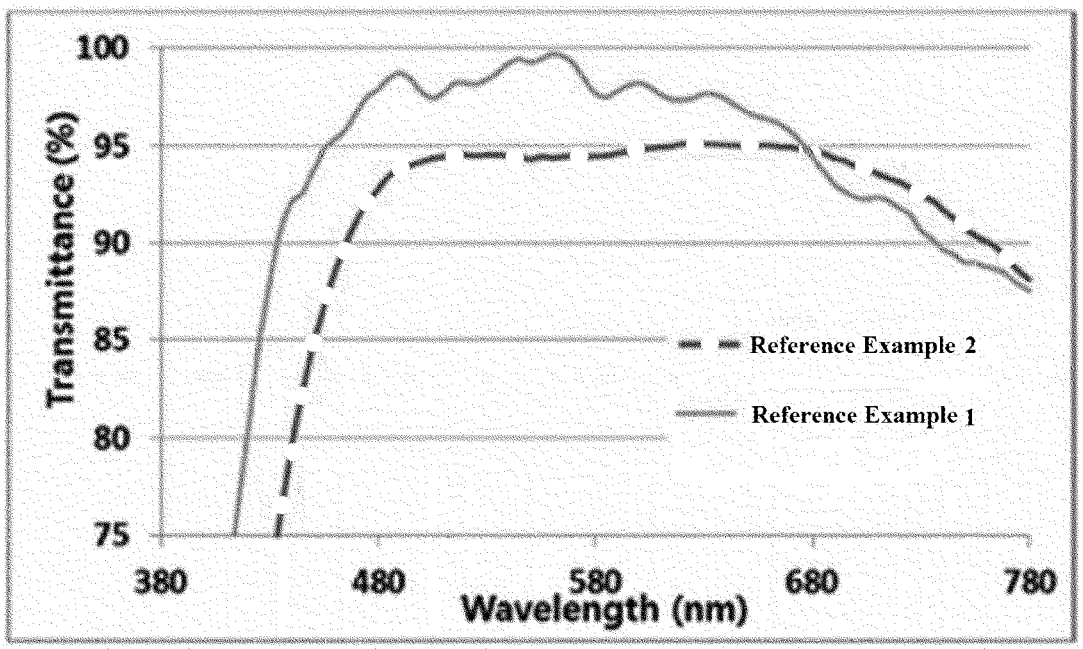
(B)

[Figure 11]
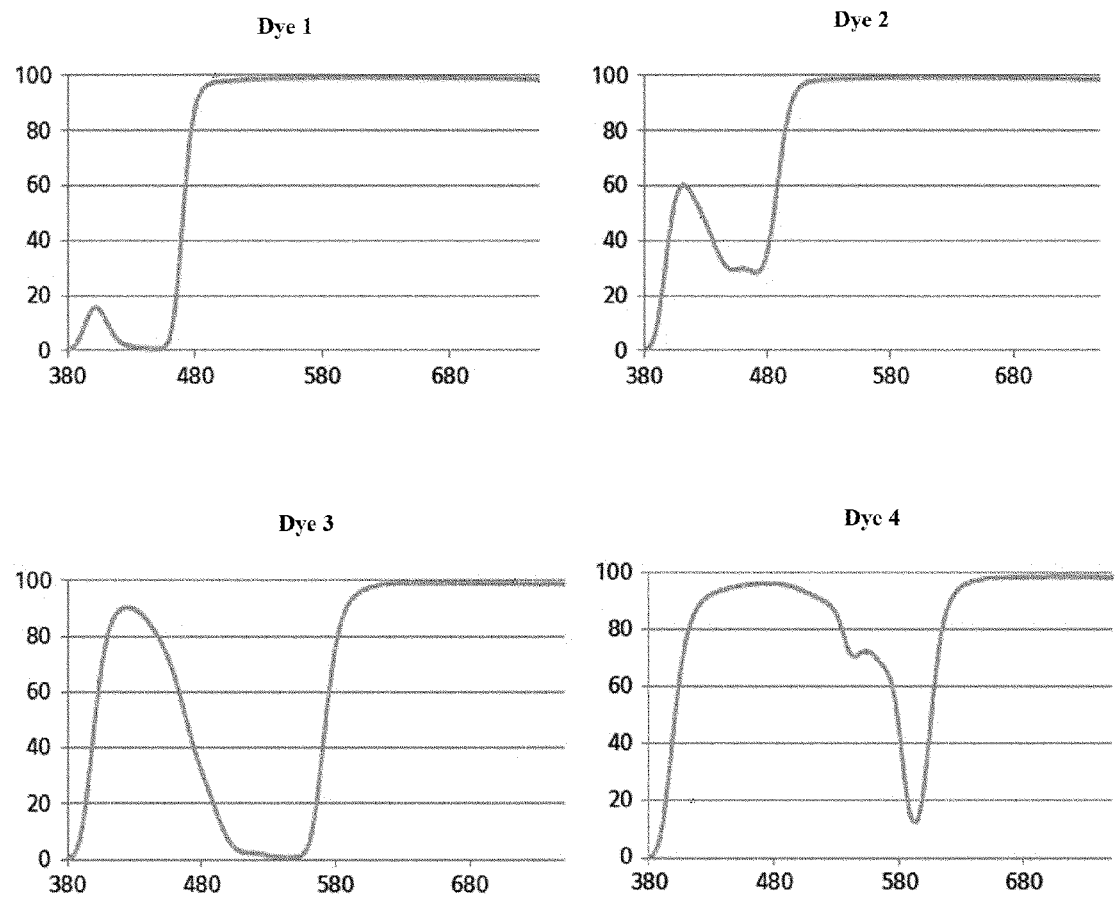

[Figure 12]
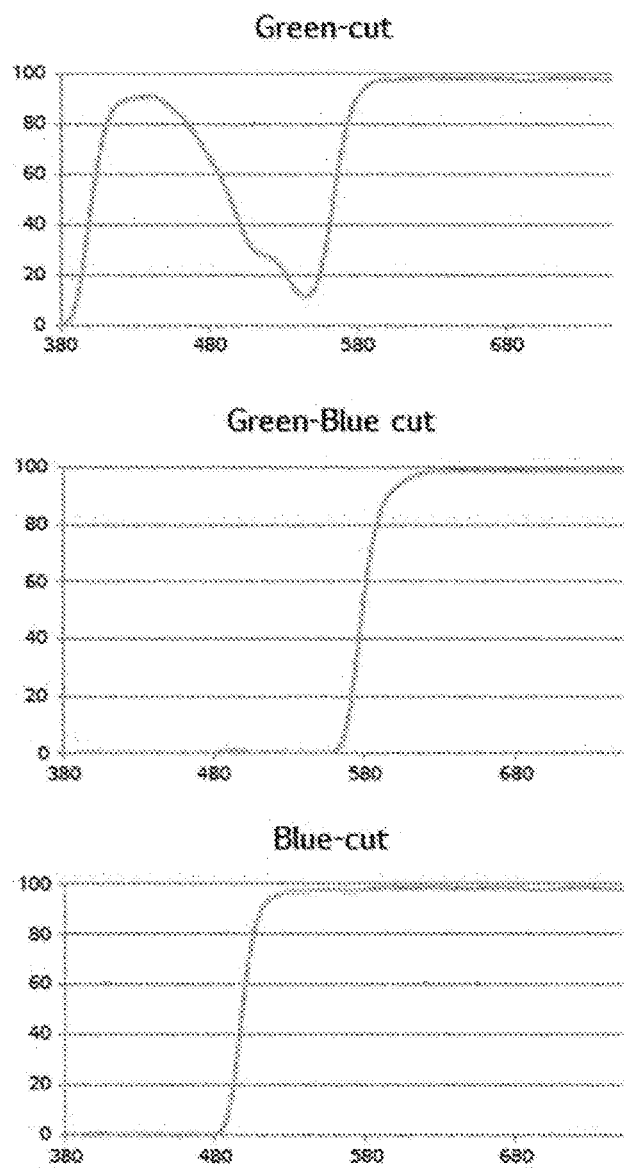

[Figure 13]
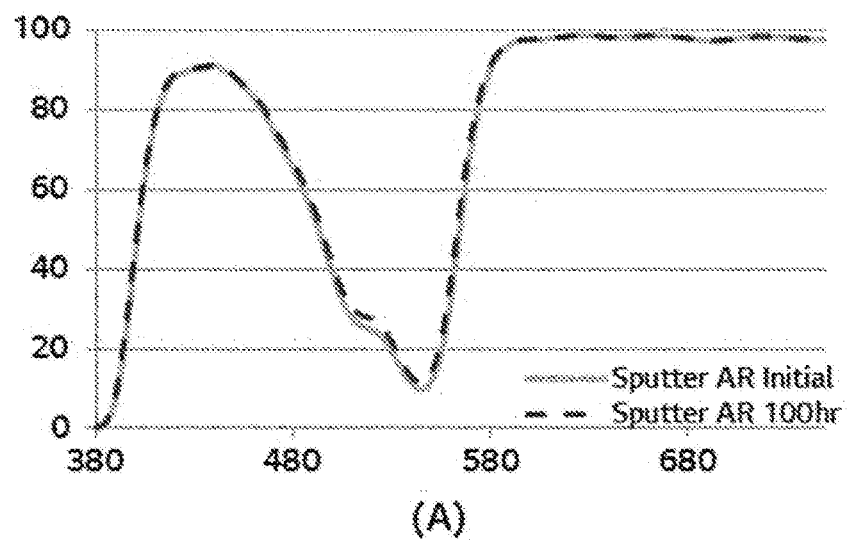
(A)
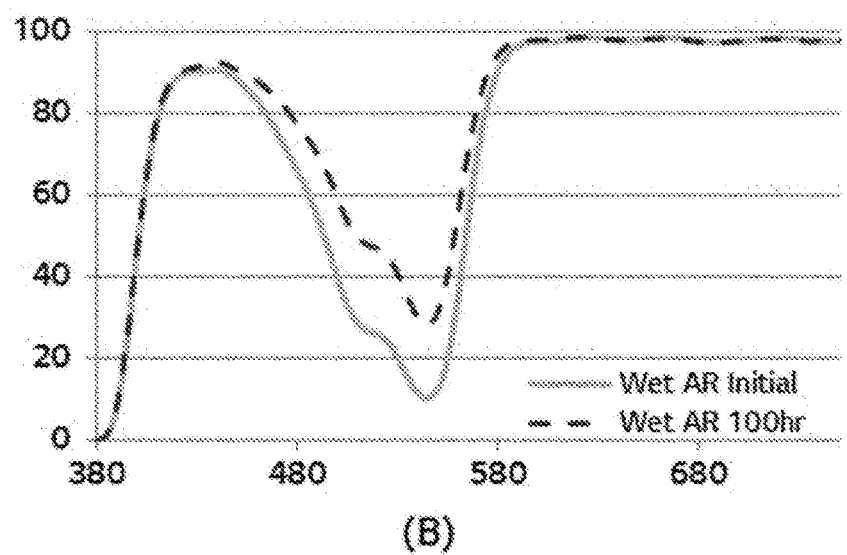
(B)

ered to as crosstalk), it may result in reducing brightness of the light
OPTICAL FILM, OPTICAL ELEMENT, AND IMAGING DEVICE The present application is a National Phase entry pursuant to 35 U.S.C. § 371 of International Application No. PCT/KR2018/066429 filed on Sep. 21, 2018, and claims priority to and the benefit of Korean Patent Application No. 10-2017-0124103 filed on Sep. 26, 2017, the disclosures of which are incorporated herein by reference in their entirety.

FIELD

This application relates to an optical film, an optical element and an imaging device.

BACKGROUND

Augmented reality is a process of combining or increasing useful information created by a computer, when images and photographs are displayed by computer programming, by superimposing them on images. In other words, it is a process of superimposing three-dimensional virtual objects into the real world. An example of devices using the augmented reality includes a head-up display device (HUD), which is applied to a canopy or helmet of a fighter or tank pilot so that the pilot can view terrain or features and simultaneous view various information. Recently, it can often be seen that can be applied to a vehicle as well, information such as a speed are displayed on the front window of the vehicle (Patent Document 1: Korean Patent Laid-Open Publication No. 2016-0109021).

An imaging device such as an augmented reality apparatus may comprise a plurality of diffractive light guide plate laminates in order to allow light from a light source to reach an observer's eye. At this time, when the light of a wavelength component matched to each diffractive light guide plate is not coupled (hereinafter, may be referred to as crosstalk), it may result in reducing brightness of the light reaching the observer's eye, obtaining uneven color and deteriorating quality of the reproduced virtual image. Accordingly, there is a demand for a technique capable of reducing the crosstalk while improving the coupling efficiency of the diffractive light guide plate.

SUMMARY

The present application relates to an optical film which is a means for solving the above problem. The optical film of the present application can satisfy Equation 1 below, have a half-wave phase retardation characteristic and have an absorption band in the visible light region.

$$R(650)/R(550) > R(450)/R(550) \quad \text{[Equation 1]}$$

In Equation 1 above, R (λ) is an in-plane retardation value of the optical film for light having a wavelength of λ nm.

In this specification, the in-plane retardation (Rin) value can be calculated by Equation 2 below.

$$Rin = d \times (nx - ny) \quad \text{[Equation 2]}$$

In Equation 2, d is a thickness of an optical film, a retardation film or a liquid crystal layer, and nx and ny are each a refractive index of the optical film, the retardation film or the liquid crystal layer in x-axis and y-axis directions. The x-axis means a direction parallel to the in-plane slow axis of the optical film, the retardation film or the liquid crystal layer, and the y-axis means a direction parallel to the in-plane fast axis of the optical film, the retardation film or the liquid crystal layer. The x-axis and the y-axis may be orthogonal to each other in the plane of the optical film. In this specification, while the in-plane retardation is described, unless otherwise specified, it means an in-plane retardation for light having a wavelength of 550 nm.

BRIEF DESCRIPTION OF THE DRAWINGS

FIG. 1 illustratively shows an optical film of the present application.

FIG. 2 illustratively shows an optical film of the present application.

FIG. 3 illustratively shows an optical film of the present application.

FIG. 4 illustratively shows an optical film of the present application.

FIG. 5 illustratively shows an optical film of the present application.

FIG. 6 illustratively shows an optical film of the present application.

FIG. 7 illustratively shows the structure of the diffractive light guide plate and the total internal reflection of the light rays coupled to the inside or outside of the diffractive light guide plate.

FIG. 8 illustratively shows an optical element of the present application.

FIG. 9 illustratively shows coupling efficiency improvement and crosstalk reduction principles using an optical element of the present application.

FIG. 10 is absorption axis transmittance (A) and transmission axis transmittance (B) graphs of Reference Example 1 and Reference Example 2 for wavelengths.

FIG. 11 is transmittance graphs of four dyes having different absorption bands for wavelengths.

FIG. 12 is transmittance graphs of a pressure-sensitive adhesive layer containing a dye for wavelengths.

FIG. 13 is transmittance graphs of Example 1(A) and Example 2(B) for wavelengths after light resistance tests.

DETAILED DESCRIPTION

In this specification, when the term such as vertical, horizontal, orthogonal or parallel is used while defining an angle, it means substantially vertical, horizontal, orthogonal, or parallel to the extent that the desired effect is not impaired, which includes, for example, an error that takes a production error or a deviation (variation), and the like, into account. For example, each case of the foregoing may include an error within about ±15 degrees, an error within about ±10 degrees or an error within about ±5 degrees.

The optical film can exhibit a desired phase retardation characteristic in the visible light wavelength region by satisfying Equation 1 above. The characteristic satisfying Equation 1 above can be referred to as a reverse wavelength dispersion characteristic.

In one example, the value of R(650)/R(550) in the optical film may be 1.01 to 1.19, 1.02 to 1.18, 1.03 to 1.17, 1.04 to 1.16, 1.05 to 1.15, 1.06 to 1.14, 1.07 to 1.13, 1.08 to 1.12 or 1.09 to 1.11. In one example, the value of R(450)/R(550) in the optical film may be 0.81 to 0.99, 0.82 to 0.98, 0.83 to 0.97, 0.84 to 0.96, 0.85 to 0.95, 0.86 to 0.94, 0.87 to 0.93, 0.88 to 0.92 or 0.89 to 0.91.

The optical film may have a half-wave phase retardation characteristic. In this specification, the term "n-wavelength phase retardation characteristic" may mean a characteristic that the incident light can be phase-delayed by n times the wavelength of the incident light within at least a part of the wavelength range. In this specification, the half-wave phase retardation characteristic may mean that the in-plane retardation value for light having a wavelength of 550 nm is 200 nm to 290 nm or 240 nm to 280 nm.

If the optical film has a half-wave phase retardation characteristic, it can rotate the vibration direction of the incident polarized light by 90 degrees. As described below, the diffractive light guide plate can pass light in a wavelength band of a specific polarization state, where light in a wavelength band of another polarization state can be coupled into the diffractive light guide plate. The optical film can control the polarization state of the wavelength component so as to be coupled to the diffractive light guide plate. Therefore, the optical film can improve the coupling efficiency of the diffractive light guide plate and reduce the crosstalk.

The optical film may have an absorption band in the visible light wavelength region. In this specification, the visible light may mean light rays in the wavelength range of about 380 nm to 750 nm. In this specification, the "absorption band" may mean a wavelength band including the wavelength of the point exhibiting the highest absorbance or the point exhibiting the lowest transmittance when the absorbance or the transmittance for wavelengths has been measured. In one example, the absorption band herein may mean a wavelength band of the point exhibiting transmittance of about 20% or less in the transmittance spectrum for wavelengths. The width of the wavelength band may be, for example, about 20 nm or more.

In one example, the absorption band of the optical film may comprise one or more wavelength regions of a red wavelength region, a green wavelength region and a blue wavelength region. In this specification, the red wavelength region may mean about 620 nm to 750 nm, the green wavelength region may mean about 495 nm to 570 nm, and specifically, 500 nm to 570 nm, and the blue wavelength region may mean about 450 nm to 495 nm, and specifically, 450 nm to 490 nm. In one example, the optical film may have an absorption band in any one wavelength region among combinations of the wavelength regions, or may have an absorption band in a combination of two wavelength regions among combinations of the wavelength regions.

As the optical film has an absorption band in the visible light wavelength region, when the optical film is used together with the diffractive light guide plate, as described below, it can absorb the residual light transmitted without being coupled to the diffractive light guide plate, thereby further suppressing the crosstalk.

In one example, the optical film may sequentially comprise a first retardation film (10), a color filter layer (30) and a second retardation film (20), as shown in FIG. 1. The first retardation film (10) may satisfy Equation 1 above and have a quarter-wave phase retardation characteristic. The color filter layer (30) may comprise a dye having an absorption band in the visible light wavelength region. The second retardation film (20) may satisfy Equation 1 above and have a quarter-wave phase retardation characteristic. In this specification, the quarter-wave phase retardation characteristic may mean that the in-plane retardation value for light having a wavelength of 550 nm is 130 nm to 200 nm, 130 to 180 nm, or 130 to 150 nm. The optical film of the present application has a vertically symmetrical structure based on the color filter layer, so that curling occurring in a thin film can be minimized.

In one example, the first retardation film and the second retardation film may have a multilayer structure comprising a first liquid crystal layer having a half-wave phase retardation characteristic and a second liquid crystal layer having a quarter-wave phase retardation characteristic. Such a multilayer structure can be advantageous for realizing broadband phase retardation characteristic.

FIG. 2 illustratively shows an optical film sequentially comprising a first retardation film including a first liquid crystal layer (101) and a second liquid crystal layer (102), a color filter layer (30) and a second retardation film including a second liquid crystal layer (202) and a first liquid crystal layer (201).

In one example, the optical axis of the first retardation film and the optical axis of the second retardation film may be parallel to each other. Accordingly, the optical film can be advantageous for realizing the half-wave phase retardation characteristic as the sum of the phase retardation characteristics of the first retardation film and the second retardation film.

Hereinafter, while the first liquid crystal layer and the second liquid crystal layer are described, unless otherwise specified, the description can be commonly applied to the first liquid crystal layer and the second liquid crystal layer included in the first retardation film and the second retardation film.

In one example, the second liquid crystal layer may be disposed closer to the color filter layer than the first liquid crystal layer. Through this structure, the optical film can be advantageous for realizing the half-wave phase retardation characteristic.

In one example, the optical axis of the first liquid crystal layer and the optical axis of the second liquid crystal layer may form 55 degrees to 65 degrees, 57 degrees to 63 degrees, or 59 degrees to 61 degrees, to each other. Accordingly, it may be more advantageous to realize a retardation film satisfying Equation 1 above and having a quarter-wave phase retardation characteristic.

In one example, the optical axis of the first liquid crystal layer may form 12.5 degrees to 17.5 degrees and the optical axis of the second liquid crystal layer may form 72.5 degrees to 77.5 degrees, based on the transverse direction (TD, direction orthogonal to the mechanical flow direction) or the longitudinal direction (MD; mechanical direction, mechanical flow direction). Accordingly, it may be more advantageous to realize a retardation film satisfying Equation 1 above and having a quarter-wave phase retardation characteristic. In one example, the longitudinal direction may mean the longitudinal direction of the optical film, and the transverse direction may mean the width direction of the optical film.

In one example, each of the first and second liquid crystal layers may have a reverse wavelength dispersion characteristic, a normal wavelength dispersion characteristic, or a flat wavelength dispersion characteristic. In this specification, the reverse wavelength dispersion characteristic may mean a characteristic that satisfies Equation 1 above. The normal wavelength dispersion characteristic may mean a characteristic that satisfies Equation 3 below, and the flat wavelength dispersion characteristic may mean a characteristic that satisfies Equation 4 below.

$$R(650)/R(550) < R(450)/R(550) \qquad \text{[Equation 3]}$$

$$R(650)/R(550) \approx R(450)/R(550) \qquad \text{[Equation 4]}$$

In Equations 3 and 4, R ($\lambda$) is an in-plane retardation value of an optical film, a retardation film or a liquid crystal layer for light having a wavelength of $\lambda$ nm.

The first and second liquid crystal layers may each comprise a liquid crystal compound. The liquid crystal compound may be a polymerizable liquid crystal compound. In one example, the first and second liquid crystal layers may comprise the polymerizable liquid crystal compound in a polymerized form. In this specification, the term "polymerizable liquid crystal compound" may mean a compound containing a moiety capable of exhibiting liquid crystallinity, such as a mesogen skeleton, and also containing one or more polymerizable functional groups. In addition, the phrase "a polymerizable liquid crystal compound is contained in a polymerized form" may mean a state where the liquid crystal compound is polymerized to form a skeleton such as a main chain or a side chain of the liquid crystal polymer in the liquid crystal layer. In one example, the first liquid crystal layer and the second liquid crystal layer may each comprise the liquid crystal compound in a horizontally oriented state.

The first and second liquid crystal layers may each comprise a polymerizable liquid crystal compound in a non-polymerized state or may further comprise known additives such as a polymerizable non-liquid crystal compound, a stabilizer, a non-polymerizable non-liquid crystal compound or an initiator.

In one example, the first liquid crystal layer and the second liquid crystal layer may each have a difference between a refractive index in a plane slow axis direction and a refractive index in a plane fast axis direction in a range of 0.05 to 0.2, 0.07 to 0.2, 0.09 to 0.2 or 0.1 to 0.2. Here, the refractive index in the plane slow axis direction may mean the refractive index in the direction showing the highest refractive index in the plane of the liquid crystal layer, and the refractive index in the fast axis direction may mean the refractive index in the direction showing the lowest refractive index on the plane of the liquid crystal layer. Generally, in an optically anisotropic liquid crystal layer, the fast axis and the slow axis are formed in directions perpendicular to each other. Each of the refractive indices may be a refractive index measured for light having a wavelength of 550 nm or 589 nm. For example, using Axoscan from Axomatrix, the refractive index difference can be measured according to the manufacturer's manual.

In one example, the first and second liquid crystal layers may each have a thickness of about 0.5 µm to 2.0 µm or about 0.5 µm to 1.5 µm.

The liquid crystal layer having the relationship of the refractive indices and the thickness can realize the phase retardation characteristic suitable for a particular application.

Each of the first and second retardation films may be formed by a method of coating a second liquid crystal layer on a first liquid crystal layer. The first liquid crystal layer may be formed by a method of coating a first liquid crystal layer on a base layer to be described below.

The color filter layer (e.g., 20) may be a pressure-sensitive adhesive layer containing a dye and a pressure-sensitive adhesive resin. The content of the dye can be suitably controlled in consideration of the absorption band and tackiness, and the like, of the color filter layer required in the present application. The content of the dye may be included, for example, in a range of 0.5 to 20 parts by weight relative to 100 parts by weight of the pressure-sensitive adhesive resin. Specifically, the dye may be contained in a ratio of 0.5 parts by weight or more, 1 part by weight or more, or 2 parts by weight or more, and may be contained in a ratio of 20 parts by weight or less, 10 parts by weight or less, 7.5 parts by weight or less, or 5 parts by weight or less, relative to 100 parts by weight of the pressure-sensitive adhesive resin. As it is used in a diffractive light guide plate laminate within such a content range, it is possible to be suitable for reducing the crosstalk.

As the dye, one or more dyes selected from the group consisting of anthraquinone dyes, methine dyes, azomethine dyes, oxazine dyes, azo dyes, styryl dyes, coumarin dyes, porphyrin dyes, dibenzofuranone dyes, diketopyrrolopyrrole dyes, rhodamine dyes, xanthene dyes and pyrromethene dyes can be used.

The dye may have an absorption band or absorption peak in the visible light wavelength region. In this specification, the absorption peak may mean the wavelength of the point exhibiting the highest absorbance or the point exhibiting the lowest transmittance when the absorbance or the transmittance for wavelengths has been measured. The absorption band or the absorption peak of the dye may be included in the absorption band of the optical film or the color filter layer.

As the dye contained in the color filter layer, a single dye or a mixed dye may be used. In one example, in the optical film or color filter layer, if absorption bands in a somewhat broad wavelength region are required, a mixture of a plurality of dyes having absorption bands in a narrow wavelength region may also be used. The pressure-sensitive adhesive resin may include one or more selected from the group consisting of an acrylic resin, a silicone resin, an ester resin, a urethane resin, an amide resin, an ether resin, a fluorine resin and a rubber resin.

The pressure-sensitive adhesive layer may have a thickness of 7 µm to 30 µm. When the thickness range of the pressure-sensitive adhesive layer is within the above range, it may be advantageous from the viewpoint of attachment reliability between films.

In one example, the optical film may be produced by attaching the first retardation film and the second retardation film via the pressure-sensitive adhesive layer.

The optical film may further comprise a base layer. In one example, as shown in FIG. 3, the optical film may further comprise a first base layer (40) and a second base layer (50) on the outer sides of the first retardation film (10) and the second retardation film (20), respectively. In this specification, the "outer side" may mean the opposite side of the side where the color filter layer is present.

As the base layer, a film base material may be used. As the base layer, a base material having optical transparency may be used. As the base layer, a base layer that the in-plane retardation value is adjusted so as to minimize the influence on polarization may be used. In one example, as the base layer, an isotropic film may be used. In this specification, isotropy may mean a characteristic in which the in-plane retardation value is 10 nm or less. As the isotropic film, a PC (polycarbonate) film, a TAC (triacetyl cellulose) film or a COP (cycloolefin copolymer) film, and the like may be used. In another example, as the base layer, a super retardation film (SRF) may be used. Such an SRF may have an in-plane retardation value of about 1000 nm or more. As such an SRF, a PET (polyethyleneterephtalate) film may be used. In one example, if the isotropic film or super retardation film comprises a UV additive, it may be advantageous for reliability.

The optical film may further comprise an antireflection layer. In one example, the optical film may further comprise a first antireflection layer and a second antireflection layer on the outer sides of the first retardation film and the second retardation film, respectively. When the optical film further comprises other layers such as a base layer on the outer sides of the first retardation film and the second retardation film, the first antireflection layer and the second antireflection layer may exist at the outermost sides of the optical film. FIG. 4 illustratively shows an optical film comprising a first antireflection layer (60) and a second antireflection layer (70) on the outermost sides of the optical film of FIG. 3.

The optical film can improve the transmittance of the optical film through the antireflection layer. In one example, the antireflection layer can be produced by a wet coating method or a deposition method. As described below, when the optical film further comprises a barrier layer, it may be advantageous to use an antireflection layer of a deposition method in terms of improving the transmittance.

As the antireflection layer, a low refractive layer may be used. As a material of the antireflection layer suitable for the deposition method, for example, a low refractive inorganic material may be used. As the low refractive inorganic material, a material having a refractive index of about 1.45 or less, or 1.40 or less, for a wavelength of 550 nm, may be used. The low refractive inorganic material can be exemplified by, for example, metal fluoride and the like. A specific example of the metal fluoride can be exemplified by magnesium fluoride ($MgF_2$) and the like. The material of the antireflection layer suitable for the wet coating method (solution method) may be, for example, a mixture of an organic binder and low refractive particles. As the organic binder, a (co)polymer of a photopolymerizable compound can be used, where a specific example thereof can be exemplified by an acrylic resin. As the low refractive particles, particles having a refractive index of about 1.45 or less, or 1.40 or less for a wavelength of 550 nm can be used. The low refractive particles can be exemplified by hollow silica, mesoporous silica, and the like.

Figure 6:
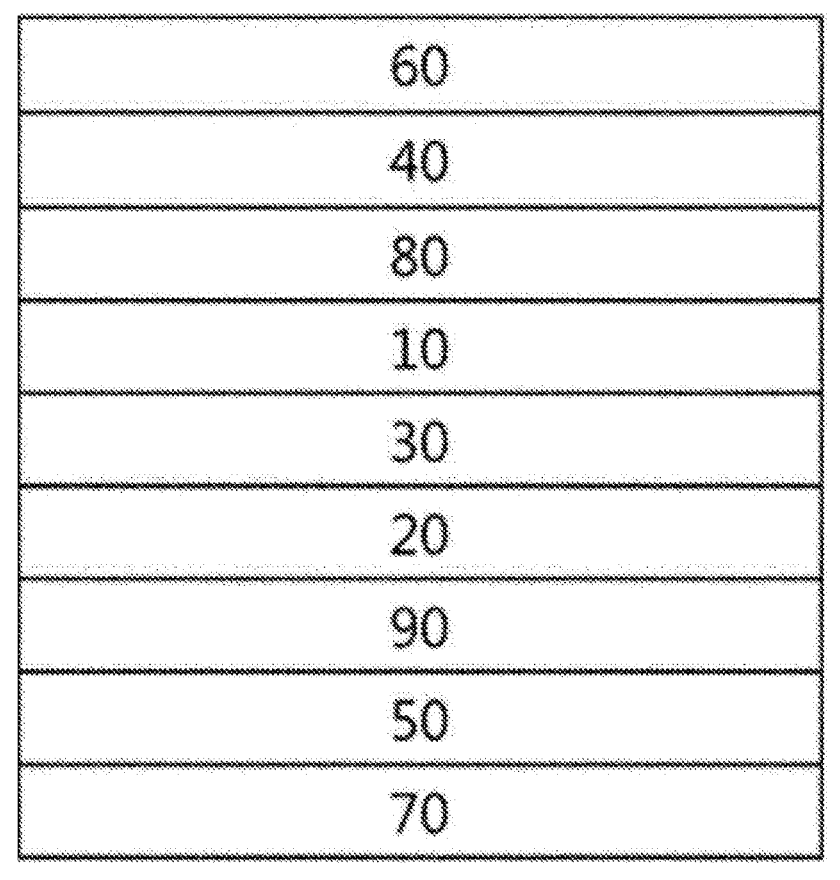

The optical film may further comprise a barrier layer. In one example, the optical film may comprise a first barrier layer on one side of the first retardation film and may comprise a second barrier layer on one side of the second retardation film. In one specific example, as shown in FIG. 5, the optical film may comprise a first barrier layer (80) between the first retardation film (10) and the color filter layer (30), and may further comprise a second barrier layer (90) between the second retardation film (20) and the color filter layer (30). In another specific example, as shown in FIG. 6, the optical film may comprise a first barrier layer (80) on the outer side of the first retardation film (10), and may further comprise a second barrier layer (90) on the outer side of the second retardation film (20). At this time, when the optical film further comprises other layers such as a base layer on the outer sides of the first retardation film and the second retardation film, the first barrier layer and the second barrier layer may be disposed more adjacent to the first retardation film and the second retardation film than other layers.

The optical film can improve light resistance through the barrier layer. For example, the dye can react with oxygen in the air to cause degradation, where the occurrence of degradation can be reduced through the barrier layer. As the barrier layer, a gas barrier layer can be used.

As the barrier layer, a layer having a function of preventing permeation of oxygen, moisture, nitrogen oxide, sulfur oxide or ozone in the atmosphere can be used. As the material of the barrier layer, a material having a function of preventing substances, such as moisture and oxygen, which promote degradation of an element from entering the element can be appropriately selected and used.

In one example, the barrier layer may comprise a metal such as In, Sn, Pb, Au, Cu, Ag, Al, Ti and Ni; a metal oxide such as TiO, $TiO_2$, $Ti_3O_3$, $Al_2O_3$, MgO, SiO, $SiO_2$, GeO, NiO, CaO, BaO, $Fe_2O_3$, $Y_2O_3$, $ZrO_2$, $Nb_2O_3$ and $CeO_2$; a metal nitride such as SiN; a metal oxynitride such as SiON; a metal fluoride such as $MgF_2$, LiF, $AlF_3$ and $CaF_2$; a polymer such as polyacrylate, polyethylene, polypropylene, polyimide, polyurea, polytetrafluoroethylene, polychlorotrifluoroethylene or polydichlorodifluoroethylene, or a copolymer of chlorotrifluoroethylene and dichlorodifluoroethylene; a copolymer obtained by copolymerizing tetrafluoroethylene with a comonomer mixture comprising at least one comonomer; a fluorine-containing copolymer having a cyclic structure in a copolymerized main chain; an absorbent material having an absorption rate of 1% or more; and a moisture-proof material having an absorption coefficient of 0.1% or less.

In one example, the barrier layer may be a single-layer structure or a multi-layer structure. The single-layer structure may comprise, for example, one barrier layer material, or may also comprise a mixture of two or more barrier layer materials. When the optical film comprises the barrier layer, the transmittance is lowered due to the light absorption and the refractive index mismatch, whereby the performance may be deteriorated. In this case, when the antireflection layer by a deposition method having a high coating film density, for example, a sputter method is applied, the light resistance can be improved without lowering the transmittance. The film comprising the antireflection layer may have a water vapor transmission rate (WVTR) of, for example, 1 $g/m^2/day$ or less.

The present application also relates to an optical element comprising the optical film. An exemplary optical element of the present application may comprise the optical film and the diffractive light guide plate. In one example, the optical element may comprise a plurality of diffractive light guide plates and the optical film disposed between the plurality of diffractive light guide plates. In a specific example, the optical element may comprise at least two diffractive light guide plates sequentially, and may comprise the optical film between the at least two diffractive light guide plates. The two diffractive light guide plates may be laminated in a superposed state. Therefore, the light that has passed through any one diffractive light guide plate of at least two diffractive light guide plates after being incident thereon can be incident on the remaining diffractive light guide plate.

In this specification, the diffractive light guide plate may mean a light guide plate comprising a plurality of diffractive optical elements (DOEs). The diffractive light guide plate may be formed of a thin flat sheet of plastic or glass. In this specification, the diffractive optical element may mean an element using diffraction by periodic structures. The diffractive optical element may be abbreviated as a diffraction grating or DOE.

FIG. 7 illustratively shows the structure of the diffractive light guide plate (100) and the total internal reflection of the wavelength band λ1 (indicated by the arrow) coupled to the inside or outside of the diffractive light guide plate. The diffractive light guide plate (100) may comprise two or more diffraction gratings, such as an input diffraction grating (10A) coupling light rays into the diffractive light guide plate and an outgoing diffraction grating (10B) diffracting the light rays out of the diffractive light guide plate. In FIG. 7, the diffraction gratings (10A, 10B) have been shown as transmissive diffraction gratings attached inside the lower surface of the substrate (10C) of the diffractive light guide plate.

The light rays of the wavelength band λ1 from the light source (300) can be collimated through a lens or the like and can be coupled to the substrate (10C) by the input diffraction grating (10A) at an incident angle θ1. The input diffraction grating (10A) can redirect the wavelength band to a diffraction angle θ2. The refractive index n2, the incident angle θ1 and the diffraction angle θ2 can be controlled so that the light rays of the wavelength band λ1 are subjected to internal total reflection within the substrate (10C). The light rays of the wavelength band λ1 can be reflected on the surface of the substrate (10C) until they reach the outgoing diffraction grating (10B) and the light rays of the wavelength band λ1 can be diffracted from the substrate (10C) toward the eye box (500).

The DOE of the diffractive light guide plate is sensitive to optical polarization. Therefore, by selectively controlling the polarized light of the wavelength band entering the DOE of the diffractive light guide plate, the wavelength band matched to the diffractive light guide plate can be coupled to the DOE with high efficiency. On the other hand, unmatched wavelength bands can pass through the diffractive light guide plate with a large width or in a wholly unaffected manner. Although an example using the DOE is described here, it is understood that the diffractive light guide plate may comprise other types of periodic structures of holograms, surface relief gratings or optical elements, as well as the DOE. Such a structure may be referred to as an "optical grating."

The diffractive light guide plate may be matched or optimized to a specific wavelength band. The relation is determined according to a lattice equation of the following Equation 5.

$$m\lambda = p(n1 \sin \theta1 + n2 \sin \theta2) \qquad [\text{Equation 5}]$$

Here, m means a diffraction order, λ means a wavelength band matched with a light guide plate or a diffraction grating, p means a lattice period, n1 means a refractive index of an incident medium, n2 means a refractive index of a light guide plate, θ1 means an incident angle, and θ2 means a diffraction angle.

The specific diffractive light guide plate comprising the input diffraction grating and the outgoing diffraction grating can be matched to a specific wavelength band by varying parameters such as the grating period p and the refractive index n2 of the light guide plate. That is, a specific wavelength band can be coupled to the matched diffractive light guide plate having a higher coupling efficiency than other wavelength bands.

The polarized light of the light incident on the diffraction grating can be defined by the direction of its electromagnetic field with respect to the incident plane. The plane can be defined by a lattice normal vector, and a propagation vector from an irradiation light source. The propagation vector is a K-vector scan of the light on the diffractive light guide plate. The lattice vector is a vector in the plane of the diffraction grating that defines the direction of the lattice line. As used herein, the term "E state" refers to a polarization state in which the electric field component of the wavelength band is zero along the lattice vector. As used herein, the term "M state" refers to a polarization state where the magnetic field component is zero along the lattice vector. The polarized light of the wavelength band incident on the diffraction grating of the diffractive light guide plate is controlled and changed between the E state and the M state. In one example, the wavelength band of the polarized M state incident on the diffraction grating passes through the light guide plate including the diffraction grating, whereas the wavelength band of the polarized E state incident on the diffraction grating is coupled into the light guide plate including the diffraction grating. The coupling or diffraction principle of the diffractive light guide plate is known, which may be referenced to the contents disclosed in Korean Patent Laid-Open Publication No. 2015-0071612.

In one example, the at least two diffractive light guide plates may be different from each other in wavelength bands to be coupled (or matched). The wavelength bands different from each other may be present in the visible light region.

In one example, the absorption band of the optical film and the coupled wavelength band of any one diffractive light guide plate among the at least two diffractive light guide plates may have a region overlapping each other. The absorption band of the optical film may have a region overlapping each other with the wavelength band coupled to the diffractive light guide plate adjacent to the optical film among the at least two diffractive light guide plates.

In one specific example, the absorption band of the optical film may have a region overlapping each other with the coupling wavelength band of the nearest diffractive light guide plate through which light is transmitted to the optical film side. Through this, the optical film can absorb the remaining light that is not coupled in the diffractive light guide plate and is transmitted, so that the crosstalk can be further suppressed.

In addition, it may be preferable that the absorption band of the optical film does not have a region overlapping each other with the coupling wavelength band of the nearest diffractive light guide plate through which the light passing through the optical film is incident. This is because the intensity of the light rays reaching the observer's eye may be weakened when absorbing the light rays in the wavelength region to be coupled to the diffractive light guide plate.

In one example, the optical element may comprise at least three diffractive light guide plates, and may comprise at least two optical films disposed between the at least three diffractive light guide plates. FIG. 8 illustratively shows such an optical element. The optical element may comprise a first diffractive light guide plate (200A), a second diffractive light guide plate (200B) and a third diffractive light guide plate (200C) sequentially. A first optical film (100A) may be disposed between the first diffractive light guide plate (200A) and the second diffractive light guide plate (200B). A second optical film (100B) may be disposed between the second diffractive light guide plate (200B) and the third diffractive light guide plate (200C). In one example, the first diffractive light guide plate, the second diffractive light guide plate and the third diffractive light guide plate may match blue, green and red wavelength bands, respectively. At this time, when the light from the light source is first incident on the first diffractive light guide plate, the first optical film may have an absorption band for blue light, and the second optical film may have absorption bands for blue and green light.

The present application also relates to an imaging device comprising the optical film or the optical element. The imaging device may comprise a light source and the optical element disposed on the light outgoing side of the light source. The optical element may allow light from the light source to reach an eye box or an observer's eye.

There are a variety of image generation techniques that can be used to implement the imaging device. The imaging device can be implemented using a transmissive scanning technique in which the light source is modulated by a white light backlight optically active material. This technique is generally implemented using an LCD-type display having a strong backlight and a high optical energy density. The imaging device may also be implemented using reflection techniques in which the external light is reflected and optically modulated by the active material. Depending on the technique, the lighting is illuminated from the top by either a white source or an RGB source. Digital light processing (hereinafter, DLP), liquid crystal on silicon (hereinafter, LCOS) and Mirasol display technologies from Qualcomm are examples of efficient, reflective technologies in which most energy is reflected from a modulation structure, which can be used in the present system.

The imaging device may further comprise a lens between the optical element and the light source. The lens may direct light from the light source to the optical element. The lens may be a collimate lens.

The light emitted from the light source may be unpolarized light, E-state polarized light or M-state polarized light. The imaging apparatus may further comprise a polarization switch between the optical element and the light source. The polarization switch can switch the polarization direction of all wavelength bands or some wavelength bands of the incident polarized light by 90 degrees.

In one example, the imaging device may be a head-up display device (HUD). The imaging device may have an eyewear type. In one example, the imaging device can be used as an augmented reality apparatus. The imaging device can be used to display a mixture of an actual object and a virtual image in a physical environment. Such an image device can prevent the crosstalk as well as improve the diffraction efficiency by applying the optical film of the present application together with the diffractive light guide plate.

FIG. 9 illustratively shows coupling efficiency improvement and crosstalk reduction principles using the optical element of the present application. Sequentially from the light source (LcoS) (300), the first diffractive light guide plate (200A) matching the blue wavelength, the second diffractive light guide plate (200B) matching the green wavelength and the third diffractive light guide plate (200C) matching the red wavelength are sequentially disposed. A first optical film (100A) having an absorption band for blue light is disposed between the first diffractive light guide plate and the second diffractive light guide plate, and a second optical film (100B) having absorption bands for green light and blue light is disposed between the second diffractive light guide plate and the third diffractive light guide plate.

The vibration direction of the M polarization state passing through the diffractive light guide plate without being coupled thereto is assumed to be 0 degree and the vibration direction of the coupled E polarization state is assumed to be 90 degrees. The red, green, and blue wavelengths are emitted from the light source (LCos) (300) to the 0-degree polarization state (M polarization state). While the light passes through the polarization switch (400), the red wavelength and the blue wavelength are converted into a 90-degree polarization state (E polarization state). While the red, green, and blue wavelengths pass through the first diffractive light guide plate (200A), the blue wavelength is coupled thereto. The blue wavelength can reach the eye box or the observer's eye (500) by the first diffractive light guide plate. The remaining blue wavelength transmitted without being coupled to the first diffractive light guide plate is absorbed by the first optical film (100A). In the red and green wavelengths passing through the first diffractive light guide plate (200A), their polarization direction is rotated by 90 degrees by the first optical film (100A). Then, the green wavelength is coupled by the second diffractive light guide plate (200B), and the red wavelength passes through the second diffractive light guide plate (200B). The green wavelength can reach the eye box or the observer's eye (500) by the second diffractive light guide plate. Thereafter, the remaining green wavelength and the remaining blue wavelength transmitted without being coupled to the second diffractive light guide plate (200B) are absorbed by the second optical film (100B). In the red wavelength, its polarization direction is rotated by 90 degrees by the second optical film (100B). Thereafter, the red wavelength is coupled to the third diffractive light guide plate (200C). The red wavelength can reach the eye box or the observer's eye (500) by the third diffractive light guide plate. Thus, through the optical film of the present application, each diffractive light guide plate can couple the matched wavelength with a high coupling efficiency, thereby reducing the crosstalk.

As long as the imaging device comprises the optical film or the optical element of the present application, other parts or structures, and the like are not particularly limited, where all contents known in this field can be appropriately applied.

The optical film of the present application does not only exhibit broadband polarization conversion characteristics in the visible light region, but also has absorption bands in the visible light region. Such an optical film can be applied to an imaging device such as an augmented reality apparatus as an optical element such as a diffractive light guide plate laminate to suppress crosstalk.

EXAMPLES

Hereinafter, the present application will be specifically described by way of examples, but the scope of the present application is not limited by the following examples.

Evaluation Example 1. Broadband Phase Retardation Characteristic Evaluation

Reference Example 1

An optical film having a structure, in which first and second retardation films having an R(650)/R(550) value larger than an R(450)/R(550) value (reverse dispersion characteristic) and a quarter-wave phase retardation characteristic were bonded together by a pressure-sensitive adhesive layer (AD701 product from LG Chemical, acrylic pressure-sensitive adhesive) such that their optical axes were parallel to each other, was prepared. Specifically, the first retardation film has a multilayer structure of a first liquid crystal layer having a half-wave phase retardation characteristic (Rin value for a wavelength of 550 nm is 275 nm) and an optical axis of 15 degrees relative to a reference axis (transverse direction) and a second liquid crystal layer having a quarter-wave phase retardation characteristic (Rin value for a wavelength of 550 nm is 137.5 nm) and an optical axis of 75 degrees relative to a reference axis (transverse direction). The second retardation film is prepared in the same manner as the first retardation film. In the bonding of the first and second retardation films, the second liquid crystal layers having the quarter-wave retardation characteristic were bonded so as to be in contact with the pressure-sensitive adhesive layer.

Reference Example 2

A retardation film (polycarbonate stretched film from Teijin Company) having an R (650)/R (550) value smaller than an R (450)/R (550) value (normal dispersion characteristic) and a half-wave phase retardation characteristic was prepared as an optical film of Reference Example 2.

For the optical films each prepared in Referential Example 1 and Reference Example 2, a sample was prepared by attaching each optical film and a polarizing film via a 20 μm thick pressure-sensitive adhesive such that the angle between the optical axis of the optical film and the absorption axis of the polarizing film was 45 degrees. For the sample, absorption axis transmittance and transmission axis transmittance were measured for wavelengths of 380 nm to 780 nm by a method of rotating the polarizer of the light source using a transmission spectrum measuring instrument from JASCO Co. to measure the minimum transmittance and the maximum transmittance, and the results were shown in Table 1 and FIG. 10. The graph (A) in FIG. 10 shows the absorption axis transmittance and the graph (B) shows the transmission axis transmittance. It can be confirmed that Reference Example 1 having the reverse dispersion characteristic has polarization conversion characteristics in the entire visible light wavelength region, and has excellent characteristics as compared to Reference Example 2 having the normal dispersion characteristic.

TABLE 1

| Wave-length (nm) | Absorption Axis Transmittance (%) | | Transmission Axis Transmittance (%) | |
|---|---|---|---|---|
| | Reference Example 1 | Reference Example 2 | Reference Example 1 | Reference Example 2 |
| 455 | 0.51 | 7.39 | 94.87 | 86.77 |
| 530 | 0.27 | 0.06 | 98.38 | 94.60 |
| 625 | 1.48 | 0.09 | 97.45 | 95.08 |

Evaluation Example 2. Visible Light Absorption Characteristic Evaluation

Visible light absorption characteristics of the pressure-sensitive adhesive layer containing a dye were evaluated.

FIG. 11 shows transmittance graphs (x-axis: wavelength [nm], y-axis: transmittance [%]) of four dyes having absorption bands in a narrow wavelength region for wavelengths. Dye 1, Dye 2, Dye 3 and Dye 4 are FDB005, FDB006, FDG003 and FDG007 products from Yamada Chemical, respectively. In the pressure-sensitive adhesive layer, an acrylic resin (AD701 product from LG Chemical) was used as a pressure-sensitive adhesive resin.

FIG. 12 shows transmittance graphs (x-axis: wavelength [nm], y-axis: transmittance [%]) of a pressure-sensitive adhesive layer containing a dye. As shown in FIG. 12, Green cut is possible using Dye 4, Green-Blue cut is possible by mixing Dye 1, Dye 2, Dye 3 and Dye 4, and Blue cut is possible by mixing Dye 1, Dye 2 and Dye 3.

Evaluation Example 3. Light Resistance Evaluation

Example 1

An optical film having the structure of FIG. 4 was prepared as Example 1. The first retardation film and the second retardation film were prepared in the same manner as in Reference Example 1. However, a pressure-sensitive adhesive layer containing the Dye 4 was used as the pressure-sensitive adhesive layer for bonding the first retardation film and the second retardation film. As the pressure-sensitive adhesive resin of the pressure-sensitive adhesive layer, an acrylic resin (AD701 product from LG Chemical) was used and the dye was added in an amount of about 3.5 parts by weight relative to 100 parts by weight of the pressure-sensitive adhesive resin. As each of the first and second antireflection layers, a sputter-type antireflection layer (Clear Type AR1.5 Grade from Dexerials) was applied using an inorganic low refractive ($MgF_2$) material.

Example 2

An optical film was prepared in the same manner as in Example 1, except that in the production of the optical film of Example 1, as each of the first and second antireflection layers, an antireflection layer (DSG03 Grade from DNP) was applied using a mixed material of a solution type PETA (pentaerythritol triacrylate) organic binder and hollow silica instead of the sputter-type antireflection layer.

For Examples 1 and 2, the transmittance according to wavelengths after the light resistance test (Atlas Ci3000) at 40° C. was evaluated using light having a wavelength of 420 nm at an intensity of 1.2 $W/m^2$, and the results were shown in FIG. 13. The graph (A) in FIG. 13 is a transmittance graph of Example 1, and the graph (B) is a transmittance graph of Example 2. When the sputter-type antireflection layer having a high coating film density is used as in Example 1, it can be confirmed that the light resistance can be improved without lowering the transmittance after the light resistance test for 100 hours relative to the beginning, as compared to the case of using the antireflection layer by the wet coating method as in Example 2.

Evaluation Example 4. Crosstalk Evaluation

Example 3

An imaging device having the structure of FIG. 9 is prepared. Specifically, the first diffractive light guide plate (200A) matching the blue wavelength, the second diffractive light guide plate (200B) matching the green wavelength, and the third diffractive light guide plate (200C) matching the red wavelength are sequentially disposed from the light source (LcoS) (300). The first optical film (100A) having an absorption band for blue light is disposed between the first diffractive light guide plate and the second diffractive light guide plate, and the second optical film (100B) having absorption bands for green light and blue light is disposed between the second diffractive light guide plate and the third diffractive light guide plate.

Comparative Example 1

A diffractive light guide plate laminate, in which the first diffractive light guide plate (200A) matching the blue wavelength, the second diffractive light guide plate (200B) matching the green wavelength and the third diffractive light guide plate (200C) matching the red wavelength are disposed sequentially from the light source (LcoS) (300), is prepared as Comparative Example 1. However, the first and second optical films of Example 1 have not been disposed between the diffractive light guide plates.

The crosstalk can be evaluated by operating the light source and measuring the intensity of light on the side where light is emitted from the diffractive light guide plate laminate. In Example 3, the RGB region shows the uniform and high light intensity (brightness), whereas in Comparative Example 1, the color is uneven in the RGB region and the intensity of light is also reduced.

EXPLANATION OF REFERENCE NUMERALS

10: first retardation film, 20: second retardation film, 30: color filter layer, 101, 201: first liquid crystal layer, 102, 202:

second liquid crystal layer, 40: first base layer, 50: second base layer, 60: first antireflection layer, 70: second antireflection layer, 80: first barrier layer, 90: second barrier layer, 100: diffractive light guide plate, 10A: input diffraction grating, 10B: outgoing diffraction grating, 10C: substrate, 100A: first optical film, 100B: second optical film, 200A: first diffractive light guide plate, 200B: second diffractive light guide plate, 200C: third diffractive light guide plate, 300: light source, 400: polarization switch, 500: eye box (observer)

The invention claimed is:

1. An optical film satisfying Equation 1 below, having a half-wave phase retardation characteristic and having an absorption band in the visible light wavelength region:

$$R(650)/R(550) > R(450)/R(550) \qquad \text{[Equation 1]}$$

wherein, $R(\lambda)$ is an in-plane retardation value of the optical film for light having a wavelength of $\lambda$ nm, the optical film comprising a first retardation film satisfying Equation 1 and having a quarter-wave phase retardation characteristic, a color filter layer including a dye having an absorption band in the visible light wavelength region, and a second retardation film satisfying Equation 1 and having a quarter-wave phase retardation characteristic.

2. The optical film according to claim 1, wherein the R(650)/R(550) value of the optical film is 1.01 to 1.19, and the R(450)/R(550) value of the optical film is 0.81 to 0.99.

3. The optical film according to claim 1, wherein the optical axis of the first retardation film and the optical axis of the second retardation film are parallel to each other.

4. The optical film according to claim 1, wherein the first retardation film and the second retardation film each comprise a multilayer structure including a first liquid crystal layer having a half-wave phase retardation characteristic and a second liquid crystal layer having a quarter-wave phase retardation characteristic.

5. The optical film according to claim 4, wherein the second liquid crystal layer is disposed closer to the color filter layer than the first liquid crystal layer.

6. The optical film according to claim 4, wherein the optical axis of the first liquid crystal layer and the optical axis of the second liquid crystal layer form 55 degrees to 65 degrees from each other.

7. The optical film according to claim 4, wherein the optical axis of the first liquid crystal layer forms 12.5 degrees to 17.5 degrees and the optical axis of the second liquid crystal layer forms 72.5 degrees to 77.5 degrees, based on the transverse direction or the longitudinal direction of the optical film.

8. The optical film according to claim 1, wherein the color filter layer is a pressure-sensitive adhesive layer comprising the dye and a pressure-sensitive adhesive resin.

9. The optical film according to claim 1, further comprising a first base layer and a second base layer on the outer sides of the first retardation film and the second retardation film, respectively.

10. The optical film according to claim 1, further comprising a first antireflection layer and a second antireflection layer on the outer sides of the first retardation film and the second retardation film, respectively.

11. The optical film according to claim 1, further comprising a first barrier layer on one side of the first retardation film and a second barrier layer on one side of the second retardation film.

12. An optical element comprising at least two diffractive light guide plates, and the optical film of claim 1 disposed between the at least two diffractive light guide plates.

13. The optical element according to claim 12, wherein the at least two diffractive light guide plates have different wavelength bands of light to be coupled.

14. The optical element according to claim 12, wherein the absorption band of the optical film and the wavelength band of the light coupled to the diffractive light guide plate adjacent to the optical film have a region overlapping each other.

15. An imaging device comprising a light source and the optical element of claim 12 disposed on a light outgoing side of the light source.

16. The imaging device according to claim 15, wherein the imaging device comprises an augmented reality apparatus.

* * * * *